(12) United States Patent
Chen et al.

(10) Patent No.: US 8,605,346 B2
(45) Date of Patent: *Dec. 10, 2013

(54) IMAGE PROCESSING APPARATUS AND METHOD FOR CONTROLLING SAME

(75) Inventors: Yi-Che Chen, New Taipei (TW);
Yu-Chu Huang, New Taipei (TW);
King-Lung Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 119 days.

This patent is subject to a terminal disclaimer.

(21) Appl. No.: 13/327,768

(22) Filed: Dec. 16, 2011

(65) Prior Publication Data

US 2012/0257263 A1 Oct. 11, 2012

(30) Foreign Application Priority Data

Apr. 6, 2011 (TW) .............................. 100111709 A

(51) Int. Cl.
*H04N 1/46* (2006.01)

(52) U.S. Cl.
USPC ............................. 358/505; 358/474; 358/501

(58) Field of Classification Search
USPC .......... 358/474, 505, 501, 1.9, 497, 496, 488, 358/448
See application file for complete search history.

(56) References Cited

U.S. PATENT DOCUMENTS

| 4,739,414 | A  | * | 4/1988  | Pryor et al. ................... 358/482 |
| 5,875,040 | A  | * | 2/1999  | Matraszek et al. ............ 358/453 |
| 6,323,963 | B1 | * | 11/2001 | Takahashi ..................... 358/474 |
| 6,330,051 | B1 | * | 12/2001 | Takanashi ...................... 355/40 |
| 6,771,842 | B1 | * | 8/2004  | Sakai et al. .................... 382/290 |
| 7,099,041 | B1 | * | 8/2006  | Moriya et al. ................. 358/1.9 |
| 7,152,942 | B2 | * | 12/2006 | Walmsley et al. ............. 347/19 |
| 7,165,824 | B2 | * | 1/2007  | Walmsley et al. ............. 347/19 |
| 7,268,909 | B2 | * | 9/2007  | Nakagiri ..................... 358/1.16 |
| 7,327,501 | B2 | * | 2/2008  | Chen ............................ 358/496 |
| 7,460,274 | B2 | * | 12/2008 | Hirano .......................... 358/2.1 |
| 8,011,747 | B2 | * | 9/2011  | Walmsley et al. ................ 347/9 |
| 8,458,583 | B2 | * | 6/2013  | Kutsumi et al. ............... 715/232 |

* cited by examiner

*Primary Examiner* — Negussie Worku
(74) *Attorney, Agent, or Firm* — Altis Laew Group, Inc.

(57) ABSTRACT

A scanner unit of a multifunction printer (MFP) increases the speed of the movement of the scanner head, lowers the scanning resolution and uses only a single scanning channel during the scanning of a blank area, and decreases the speed of the movement of the scanner head, increases the scanning resolution and uses the three scanning channels of RGB during the scanning of a graphic area.

18 Claims, 3 Drawing Sheets

IMAGE PROCESSING APPARATUS AND METHOD FOR CONTROLLING SAME

CROSS-REFERENCE TO RELATED APPLICATIONS

Relevant subject matter is disclosed in co-pending U.S. Patent Applications entitled "IMAGE PROCESSING APPARATUS AND METHOD FOR CONTROLLING SAME," Ser. No. 13/327,767 filed on the same day as this application.

BACKGROUND

1. Technical Field

The disclosure generally relates to image processing apparatuses and methods for controlling the image processing apparatuses.

2. Description of Related Art

Multifunction printers (MFPs) are used widely because MFPs are relatively small in size with low noise and can perform color copying, printing, and scanning at low cost. In recent years, MFPs have advanced in image quality and speed and thus an A4-sized image can be copied in about one minute with a quality equivalent to a photograph. However, there are still demands in MFPs enabling high-speed and high-quality scanning of images. Therefore, there is a need for a technique for scanning an image at a higher speed with no sacrifice of the image quality.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
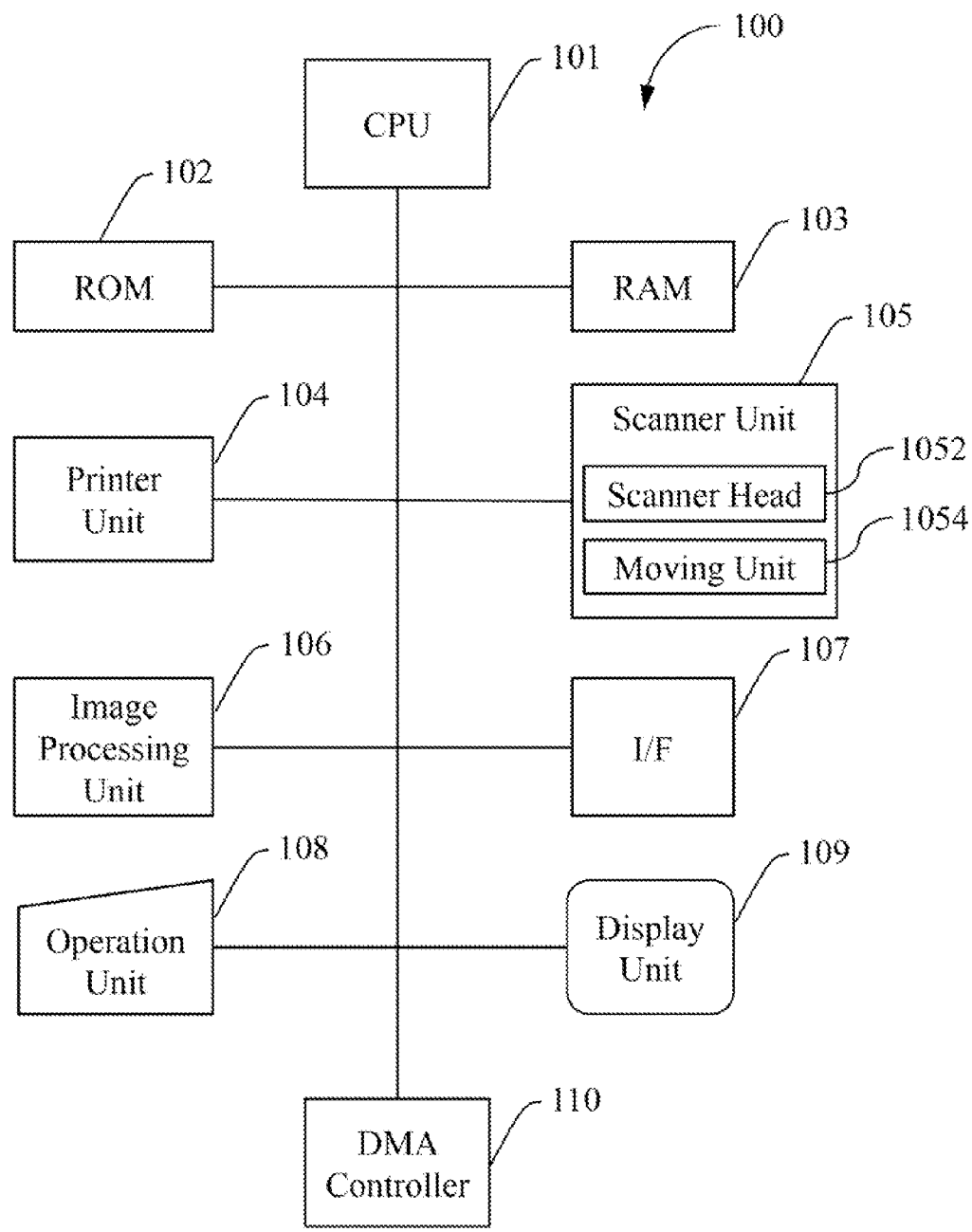
FIG. 1 is a functional block diagram of a multifunction printer (MFP) which is an example of an image processing apparatus according to an embodiment.

FIG. 1 is a functional block diagram of a multifunction printer (MFP) 100 which is an example of an image processing apparatus according to one embodiment. The MFP 100 includes a central processing unit (CPU) 101, a ROM 102, a RAM 103, a printer unit 104, a scanner unit 105, an image processing unit 106, an interface (I/F) 107, an operation unit 108, a display unit 109, and a DMA controller 110.

The CPU 101 is a processor for controlling the overall MFP 100. The MFP 100 is controlled by running one or more programs (firmware) stored in the ROM 102.

The ROM 102 is non-volatile memory for storing the program for controlling the MFP 100.

The RAM 103 is volatile memory which is used as a working area when the CPU 101 runs the program stored in the ROM 102. The RAM 103 is also used as buffer memory for temporarily storing image data from the scanner unit 105.

The printer unit 104 may print image data on a sheet of paper, an OHP sheet, and so on.

The scanner unit 105 may scan images on a sheet of paper, a plastic sheet, a film, and so on (hereinafter, will be referred to as a "medium") and generate image data. The scanner unit 105 temporarily buffers, in the RAM 103, image data having been generated by scanning images.

The scanner unit 105 may include a scanner head 1052 which has a scanning width at least equal to the overall width of the largest readable medium (for example, A4-size paper). In the scanner head 1052, a plurality of CCDs (or CISs) may be arranged in the scanning width direction. Image data is obtained by means of the CCDs detecting light from the image and converting the detected light into electrical signals. Further, the scanner head 1052 may be mechanically moved along a linear direction in stepwise fashion by a moving unit 1054, such as a motor, with the linear direction being perpendicular to the arrangement direction of the CCDs. The moving unit 1054 is functionally controlled by the CPU 101. The entire image is scanned by a combination of the electrical scanning performed by the CCDs and the mechanical movement of the scanner head 1052. In this description, a direction of electrical scanning performed by the line of CCDs at any one time is called a "main scanning direction," and the direction of mechanical movement of the scanner head 1052 is called a "sub scanning direction."

The scanner unit 105 may include three scanning channels of RGB (red, green, blue). The scanner unit 105 may scan images line-by-line and generate color image data using all or some of the three scanning channels. The color image data is image data in which color components including RGB (red, green, blue) components are represented in, for example, 8 bits (0 to 255). The number of bits representing each pixel can be freely set within the range of the capability of the CCDs or CISs. The number of bits is called "color depth."

The image processing unit 106 may perform digital image processing such as color correction and filter processing on image data, having first been buffered in the RAM 103 by the scanner unit 105.

The I/F 107 is an interface for allowing the MFP 100 to communicate with various external devices. The external devices may include, for example, a personal computer (PC) and a drive for reading and writing data in a storage medium such as a memory card. The kinds of interface used may include USB and IEEE 1394.

The operation unit 108 may be operated by the user to provide the MFP 100 with various instructions. A possible instruction includes, for example, a scan instruction for causing the scanner unit 105 to perform scanning images represented on a medium. The instruction to the MFP 100 may be provided from a PC or the like through the I/F 107.

The display unit 109 may notify the user of various information, and be made up of an LCD, an LED, or the like. The information provided to the user includes, for example, a state of the MFP 100 (scanning, printing, or idling) and the setting menu of the MFP 100.

The DMA controller 110 is a controller for transferring data between the constituent elements of the MFP 100 through DMA transfer.

Figure 2:
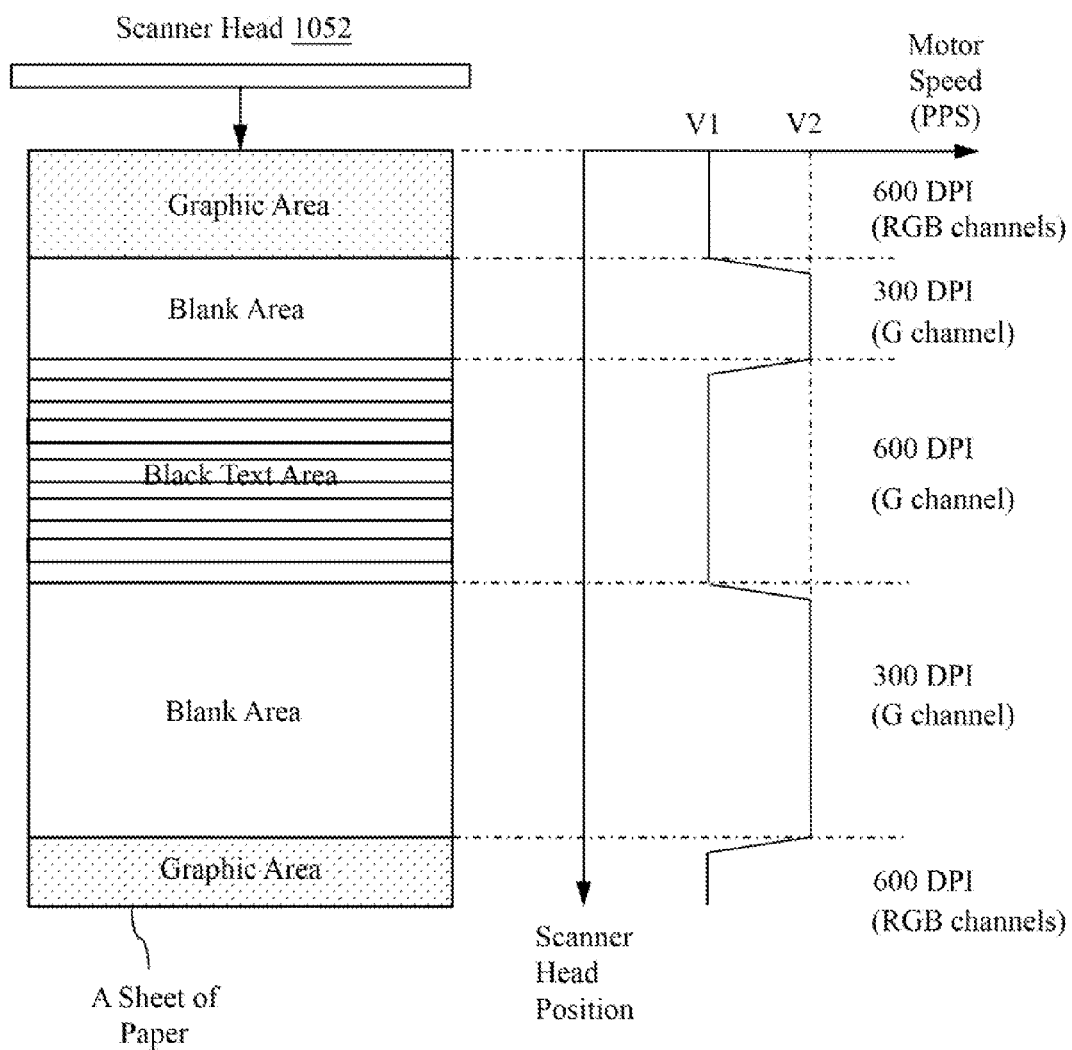
FIG. 2 is a schematic diagram showing the detail of process for scanning an image represented on a sheet of paper using the image processing apparatus of FIG. 1, according to an embodiment.

FIG. 2 is a schematic diagram showing the detail of processing for scanning an image represented on a medium using the MFP 100.

When a scan process is initiated, the moving unit 1054 moves the scanner head 1052 in the sub scanning direction (a top-to-bottom direction in FIG. 2) at a first speed (V1) and the scanner head 1052 scans the image using all of the three scanning channels with a first scanning resolution, for example, 600 dots per inch (DPI). In FIG. 2, motor speeds are represented by the unit PPS, which is pixels per second.

When the scanner head 1052 is being moved at the first speed and scanning the image using all of the three scanning channels with the first scanning resolution, the scanner unit 105 stores the image data of each scanned line in the RAM 103 and the image processing unit 106 determines type of the image area of contiguous space of a predetermined minimal size scanned by the scanner unit 105, in which the scanner head 1052 is currently located. The type of the image area may be a blank area, a black text area, or a graphic area.

The determination of the type of the image area may be made by a variety of algorithms. For example, a determination of a blank area means that pixels in a predetermined number of contiguous lines are all white. Strictly speaking, "white" means that all the pixels of RGB components have the maximum values (for example, 255 for 8 bits) in the generated image data. In consideration of human visual characteristics, a pixel exceeding a predetermined threshold value may be regarded as "white." A predetermined number may be set as the threshold minimum number of consecutive white lines which a blank area should have, for example, 80 lines. If all the pixels in the predetermined number of consecutive lines are all white, a determination can be made that the scanner head 1052 is positioned over a blank area. If the image area includes a certain number of black pixels, this may be indicative of a text area and of course text will include a significant proportion of white-space, so of course certain statistical properties of text must be taken into account when deciding whether a certain area is text area. Otherwise, if the image area includes a certain number of pixels of various colors, a determination can be made that the image area is a graphic area.

When the position of the scanner head 1052 is in a blank area, the moving unit 1054 accelerates the movement of the scanner head 1052 to a second speed (V2) higher than the first speed (V1) and the scanner head 1052 scans the image with a second scanning resolution lower than the first scanning resolution, for example, 300 DPI. In order to reduce the power consumption, the scanner head 1052 may scans the image using only a single scanning channel, for example, the green channel of green because the green channel has the best sensitivity of light among the three channels of RGB.

When the position of the scanner head 1052 is in a black text area, the moving unit 1054 decelerates the movement of the scanner head 1052 to the first speed (V1) and the scanner head 1052 scans the image using a single scanning channel (for example, the green channel) with the first scanning resolution.

When the position of the scanner head 1052 is in a graphic area, the motor of the scanner unit 105 decelerates the movement of the scanner head 1052 to the first speed (V1) and the scanner head 1052 scans the image using the three scanning channels of RGB with the first scanning resolution.

As described above, the moving unit 1054 increases the speed of the movement of the scanner head 1052, lowers the scanning resolution and uses only a single scanning channel during the scanning of a blank area, and decreases the speed of the movement of the scanner head 1052, increases the scanning resolution and uses the three scanning channels during the scanning of a graphic area, thus shortening the total scanning time and enabling high-speed image scanning with no sacrifice of the image quality.

Figure 3:
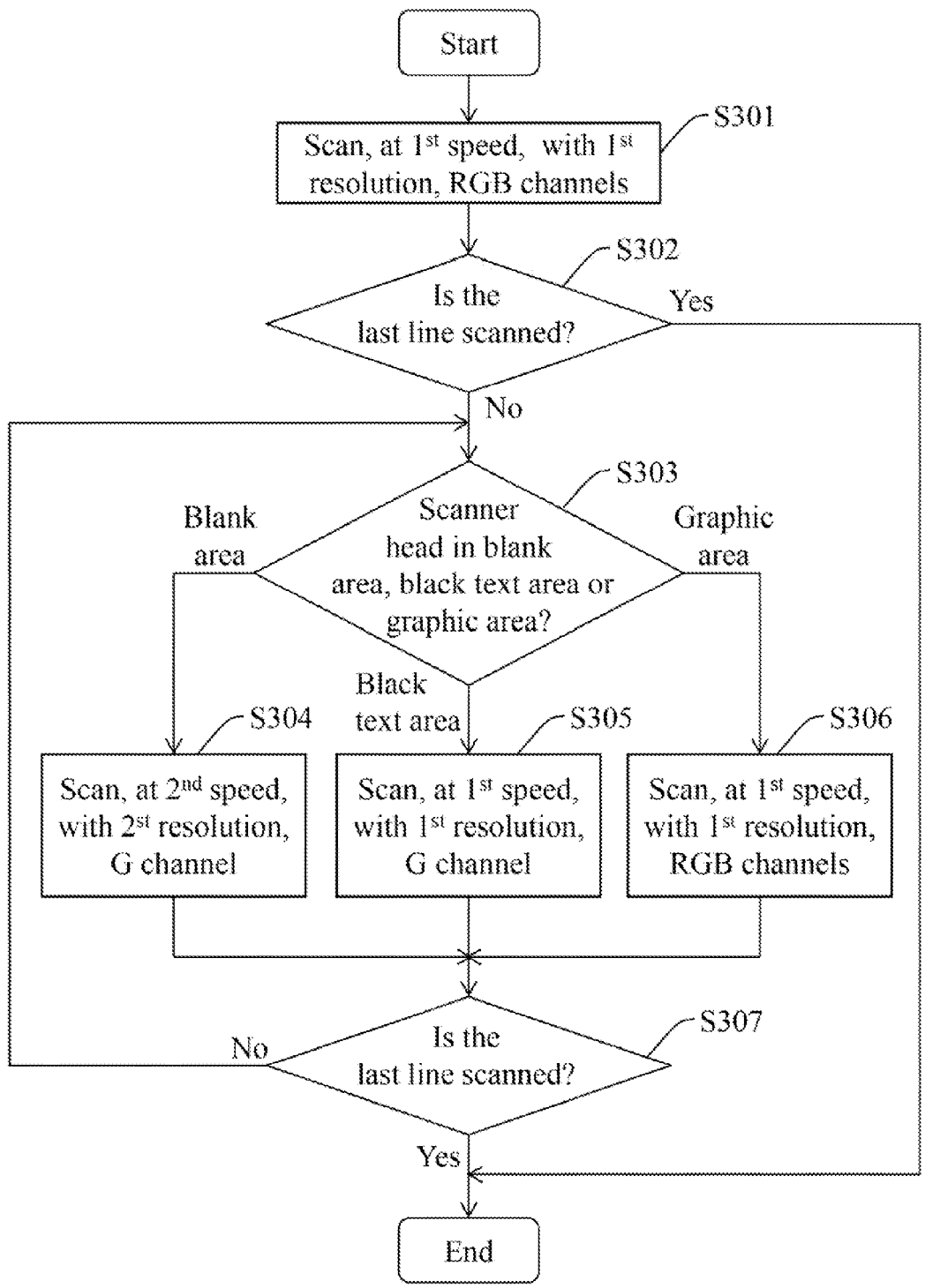
FIG. 3 is a flowchart showing an embodiment of a method for scanning the image according to FIGS. 1 and 2.

FIG. 3 is a flowchart illustrating an embodiment of a method for scanning the image according to FIGS. 1 and 2. The method may include the following steps.

In step S301, the moving unit 1054 moves the scanner head 1052 along the sub scanning direction at a first speed (V1) and the scanner head 1052 scans images on a medium using the three scanning channels with a first scanning resolution, for example, 600 DPI. The scanner unit 105 stores the image data of each scanned line in the RAM 103.

In step S302, the scanner unit 105 determines whether the medium has been fully scanned. If the last line has been scanned, it means the whole medium has been scanned and then the flow ends. Otherwise, the flow goes to step S303.

In step S303, the image processing unit 106 determines type of the image area of contiguous space of a predetermined minimal size scanned by the scanner unit 105 in which the scanner head 1052 is currently located. The type of the image area may be a blank area, a black text area, or a graphic area. If the image area is a blank area, the flow goes to step S304. If the image area is a black text area, the flow goes to step S305. If the image area is a graphic area, the flow goes to step S306.

In step S304, the moving unit 1054 moves the scanner head 1052 along the sub scanning direction at a second speed (V2) higher than the first speed (V1) and the scanner head 1052 scans images on the medium using a single scanning channel (for example, the green channel) with a second scanning resolution lower than the first scanning resolution, for example, 300 DPI. The scanner unit 105 stores the image data of each scanned line in the RAM 103. Then the flow goes to step S307.

In step S305, the moving unit 1054 moves the scanner head 1052 along the sub scanning direction at the first speed (V1) and the scanner head 1052 scans images on the medium using a single scanning channel (for example, the green channel) with the first scanning resolution. The scanner unit 105 stores the image data of each scanned line in the RAM 103. Then the flow goes to step S307.

In step S306, the moving unit 1054 moves the scanner head 1052 along the sub scanning direction at the first speed (V1) and the scanner head 1052 scans images on the medium using the three scanning channels with the first scanning resolution. The scanner unit 105 stores the image data of each scanned line in the RAM 103. Then the flow goes to step S307.

In step S307, the scanner unit 105 determines whether the medium has been fully scanned. If the last line has been scanned, it means the whole medium has been scanned and then the flow ends. Otherwise, the flow goes to step S303.

Although numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

Depending on the embodiment, certain steps or methods described may be removed, others may be added, and the sequence of steps may be altered. The description and the claims drawn for or in relation to a method may include some indication in reference to certain steps. However, any indication used is only to be viewed for identification purposes and not as a suggestion as to an order for the steps.

What is claimed is:

1. An image processing apparatus for scanning an image printed on a medium and performing image processing, the image processing apparatus comprising:
   a scanner unit comprising:
      a scanner head with a scanning width at least covering a width in a first direction of the medium, and the scanner head comprising three scanning channels of red, green, and blue for generating image data represented by RGB luminance components; and
      a moving unit configured to move the scanner head in a second direction perpendicular to the first direction;
   a central processing unit configured to control the scanner head and the moving unit to perform a scanning operation such that the moving unit moves the scanner head at a first speed and the scanner head scans the image using the three scanning channels; and
   an image processing unit configured to determine type of an area of contiguous space of a predetermined minimal size scanned by the scanner head;
   wherein the central processing unit is further configured to:
      control the scanner head and the moving unit to perform the scanning operation such that the moving unit moves the scanner head at a second speed higher than the first speed and the scanner head scans the image using the single channel of green, when the area is a blank area based on a determination result of the image processing unit,
      control the scanner head and the moving unit to perform the scanning operation such that the moving unit moves the scanner head at the first speed and the scanner head scans the image using the single channel of green, when the area is a black text area based on the determination result of the image processing unit, and
      control the scanner head and the moving unit to perform the scanning operation such that the moving unit moves the scanner head at the first speed and the scanner head scans the image using the three channels, when the area is a graphic area based on the determination result of the image processing unit.

2. The image processing apparatus of claim 1, wherein the central processing unit is further configured to control the scanner head and the moving unit to perform the scanning operation such that the scanner head scans the image with a first resolution.

3. The image processing apparatus of claim 2, wherein the central processing unit is further configured to control the scanner head and the moving unit to perform the scanning operation such that the scanner head scans the image with a second resolution lower than the first resolution, based on the determination result of the image processing unit.

4. The image processing apparatus of claim 2, wherein the central processing unit is further configured to control the scanner head and the moving unit to perform the scanning operation such that the scanner head scans the image with the first resolution, based on the determination result of the image processing unit.

5. The image processing apparatus of claim 2, wherein the central processing unit is further configured to control the scanner head and the moving unit to perform the scanning operation such that the scanner head scans the image with the first resolution, based on the determination result of the image processing unit.

6. The image processing apparatus of claim 1, wherein the image processing unit is configured to determine the type of the area based on values of the RGB luminance components representing pixels of the image data of the area.

7. An image processing apparatus for scanning an image printed on a medium and performing image processing, the image processing apparatus comprising:
   a scanner unit comprising:
      a scanner head having at least a scanning width corresponding to a width in a first direction of the medium and the scanner head comprising three scanning channels of red, green and blue for generating image data represented by RGB luminance components; and
      a moving unit configured to move the scanner head in a second direction perpendicular to the first direction;
   a first processing unit configured to control the scanner head and the moving unit to perform a scanning operation such that the scanner head scans the image with a first resolution using the three scanning channels;
   an image processing unit configured to determine type of an area of contiguous space of a predetermined minimal size scanned by the scanner head;
   wherein the processing unit is further configured to
      control the scanner head and the moving unit to perform the scanning operation such the scanner head scans the image with a second resolution lower than the first resolution using the single channel of green, when the area is a blank area based on a determination result of the image processing unit,
      control the scanner head and the moving unit to perform the scanning operation such that the scanner head scans the image with the first resolution using the single channel of green, when the area is a black text area based on the determination result of the image processing unit, and
      control the scanner head and the moving unit to perform the scanning operation such that the scanner head scans the image with the first resolution using the three channels, when the area is a graphic area based on the determination result of the image processing unit.

8. The image processing apparatus of claim 7, wherein the central processing unit is further configured to control the scanner head and the moving unit to perform the scanning operation such that the moving unit moves the scanner head at a first speed.

9. The image processing apparatus of claim 8, wherein the central processing unit is further configured to control the scanner head and the moving unit to perform the scanning operation such that the moving unit moves the scanner head at a second speed higher than the first speed, based on the determination result of the image processing unit.

10. The image processing apparatus of claim 8, wherein the central processing unit is further configured to control the scanner head and the moving unit to perform the scanning operation such that the moving unit moves the scanner head at the first speed, based on the determination result of the image processing unit.

11. The image processing apparatus of claim 8, wherein the central processing unit is further configured to control the scanner head and the moving unit to perform the scanning operation such that the moving unit moves the scanner head at the first speed, based on the determination result of the image processing unit.

12. The image processing apparatus of claim 7, wherein the image processing unit is configured to determine the type of the area based on values of the RGB luminance components representing pixels of the image data of the area.

13. A control method for controlling an image processing apparatus for scanning an image printed on a medium, the image processing apparatus comprising a scanner head having at least a scanning width corresponding to a width in a first direction of the medium and a moving unit configured to move the scanner head in a second direction perpendicular to the first direction, the scanner head comprising three scanning channels of red, green and blue for generating image data represented by RGB luminance components, the method comprising:
controlling, by a first processing control unit, the scanner head and the moving unit to perform a scanning operation such that the scanner head scans the image with a first resolution using the three scanning channels;
determining, by an image processing unit, type of an area of contiguous space of a predetermined minimal size scanned by the scanner head;
when the area is a blank area, controlling, by the central processing unit, the scanner head and the moving unit to perform the scanning operation such that the scanner head scans the image with a second resolution lower than the first resolution using the single channel of green;
when the area is a black text area, controlling, by the central processing unit, the scanner head and the moving unit to perform the scanning operation such that the scanner head scans the image with the first resolution using the single channel of green; and
when the area is a graphic area, controlling, by the central processing unit, the scanner head and the moving unit to perform the scanning operation such that the scanner head scans the image with the first resolution using the three channels.

14. The control method of claim 13, further comprising controlling, by the central processing unit, the scanner head and the moving unit to perform a scanning operation such that the moving unit moves the scanner head at a first speed.

15. The control method of claim 14, further comprising controlling, by the central processing unit, the scanner head and the moving unit to perform a scanning operation such that the moving unit moves the scanner head at a second speed higher than the first speed.

16. The control method of claim 14, further comprising controlling, by the central processing unit, the scanner head and the moving unit to perform a scanning operation such that the moving unit moves the scanner head at the first speed.

17. The control method of claim 14, further comprising controlling, by the central processing unit, the scanner head and the moving unit to perform a scanning operation such that the moving unit moves the scanner head at the first speed.

18. The control method of claim 13, wherein the determining the type of the area is based on values of the RGB luminance components representing pixels of the image data of the area.

* * * * *